United States Patent
Olsen

(10) Patent No.: US 11,085,573 B2
(45) Date of Patent: Aug. 10, 2021

(54) MACHINE FOOT WITH BUILT-IN LOAD CELL AND METHOD OF PRODUCTION THEREOF

(71) Applicant: NGI A/S, Nørresundby (DK)

(72) Inventor: Tomas Hecht Olsen, Klarup (DK)

(73) Assignee: NGI A/S, Nørresundby (DK)

( * ) Notice: Subject to any disclaimer, the term of this patent is extended or adjusted under 35 U.S.C. 154(b) by 77 days.

(21) Appl. No.: 16/325,004

(22) PCT Filed: Aug. 21, 2017

(86) PCT No.: PCT/DK2017/050271
§ 371 (c)(1),
(2) Date: Feb. 12, 2019

(87) PCT Pub. No.: WO2018/041316
PCT Pub. Date: Mar. 8, 2018

(65) Prior Publication Data
US 2019/0226627 A1    Jul. 25, 2019

(30) Foreign Application Priority Data

Sep. 1, 2016 (DK) ........................... PA 2016 70671
Feb. 20, 2017 (DK) ........................... PA 2017 70115

(51) Int. Cl.
*F16M 7/00* (2006.01)
*B29C 70/68* (2006.01)
*B29L 31/00* (2006.01)

(52) U.S. Cl.
CPC ................ *F16M 7/00* (2013.01); *B29C 70/68* (2013.01); *B29L 2031/7502* (2013.01); *F16M 2200/08* (2013.01)

(58) Field of Classification Search
CPC ...... F16M 7/00; F16M 2200/08; B29C 70/68; B29L 2031/7502; A47B 91/024;
(Continued)

(56) References Cited

U.S. PATENT DOCUMENTS 3,565,196 A * 2/1971 Laimins ............... G01G 3/1408
177/211
4,846,436 A * 7/1989 Young .................. F16F 15/027
248/542

(Continued)

FOREIGN PATENT DOCUMENTS

EP    0 670 480 A1    9/1995
FR    2 926 634 A1    7/2009
WO    WO 2015/197065 A1    12/2015

*Primary Examiner* — Christopher Garft
(74) *Attorney, Agent, or Firm* — Birch, Stewart, Kolasch & Birch, LLP.

(57) ABSTRACT

A machine foot with a built-in load cell is provided, the load cell being suspended in an overlying sheath, with the feature that the screws which hold the load cell in place in the lower part of the machine foot pass through a bottom plate and are screwed up into a fastening ring that is separate from the sheath material. A method of production of a machine foot is provided, by which a rubber resin is moulded down into the sheath of the machine foot and is vulcanized thereto, the fastening ring being embedded in the rubber resin in an area that abuts the lower side of the sheath.

10 Claims, 11 Drawing Sheets

Figure 1:
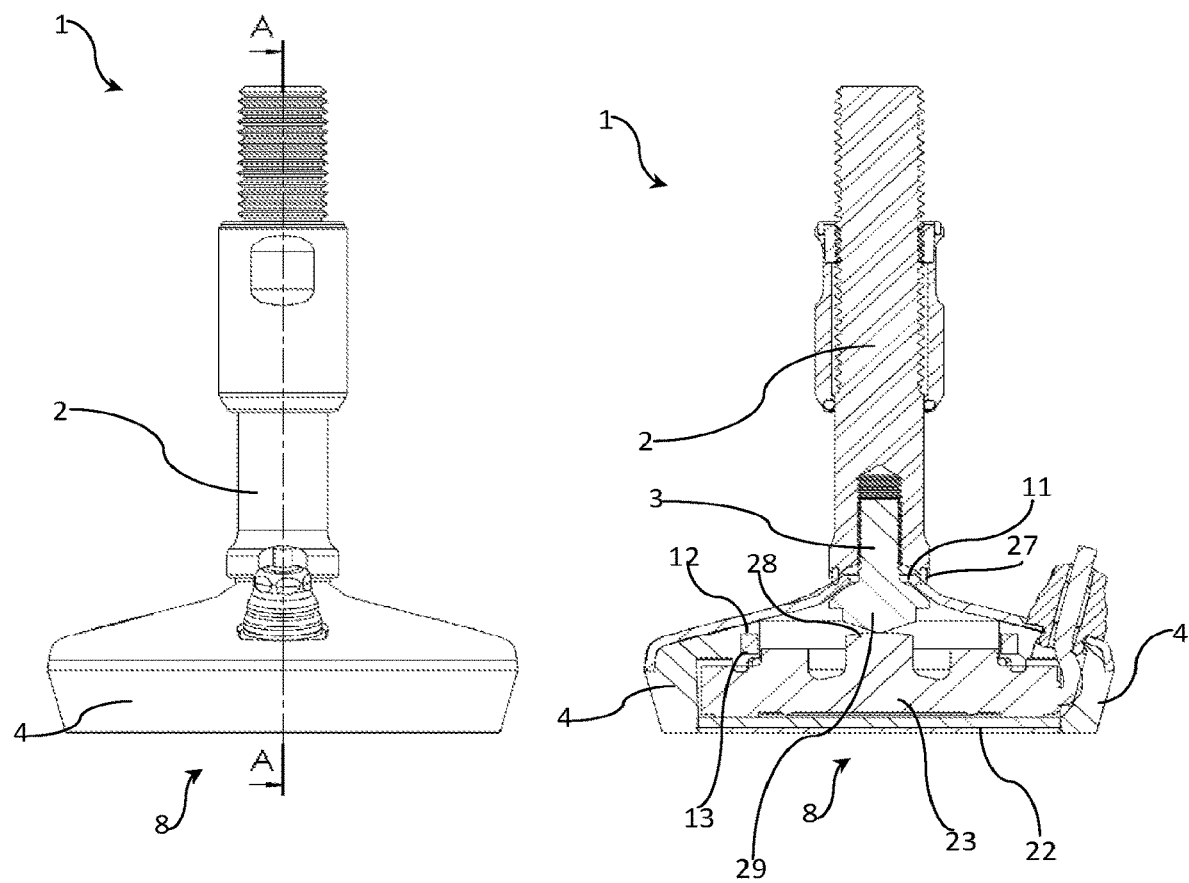

(58) Field of Classification Search
CPC ..... A47B 91/02; A47B 91/022; A47B 91/026;
A47B 91/028; A47B 91/08; A47B 91/00;
G01B 21/23; G01B 21/32
See application file for complete search history.

(56) References Cited

U.S. PATENT DOCUMENTS

| | | | | |
|---|---|---|---|---|
| 5,313,022 | A * | 5/1994 | Piroozmandi | G01L 1/2231 |
| | | | | 177/211 |
| 5,801,339 | A * | 9/1998 | Boult | G01G 17/08 |
| | | | | 177/261 |
| 5,881,533 | A * | 3/1999 | Focke | F16M 7/00 |
| | | | | 53/396 |
| 5,918,849 | A * | 7/1999 | Bliss | A47G 33/1213 |
| | | | | 248/523 |
| 6,616,369 | B2 * | 9/2003 | Clark | E01F 9/681 |
| | | | | 116/63 R |
| 7,538,281 | B2 * | 5/2009 | Pottebaum | G01G 19/12 |
| | | | | 177/211 |
| 7,726,620 | B1 * | 6/2010 | Kleespie | F17C 13/002 |
| | | | | 248/346.01 |
| 9,826,835 | B1 * | 11/2017 | Carpinella | A47C 7/008 |
| 10,059,529 | B1 * | 8/2018 | Kulkarni | B65G 41/00 |
| 2007/0261894 | A1 * | 11/2007 | Harish | G01G 23/3735 |
| | | | | 177/211 |
| 2012/0146878 | A1 * | 6/2012 | Pacetti | H01Q 3/02 |
| | | | | 343/882 |
| 2015/0014511 | A1 * | 1/2015 | Beutelspacher | A61B 90/50 |
| | | | | 248/648 |

* cited by examiner

MACHINE FOOT WITH BUILT-IN LOAD CELL AND METHOD OF PRODUCTION THEREOF

The invention relates to a machine foot with built-in load cell, said load cell being suspended in an overlying sheath.

One such load cell is known from PCT/DK/2015/050151. The load cell which is shown in this application is suspended in screws which fix a bottom plate in relation to a sheath, said screws being fastened with threads straight from the bottom through the bottom plate and up into the sheath material. The screws keep the load cell in place, so that it does not fall down and out of the lower part of the machine foot, and at the same time they can carry the load of the machine which the foot is mounted in, in case the lower part of the foot is only supported along its rim outside the circumference om the bottom plate, and where the bottom plate is not in contact with the subsurface or receives a pressure from the subsurface.

With the known machine foot, it takes a rather thick sheath material for the screws to obtain a solid fastening thereof, and this makes the foot heavy and also expensive to produce.

According to the invention a machine foot with a built-in load cell is provided, wherein the screws which hold the load cell in place in the lower part of the machine foot, pass through the bottom plate and are screwed up into a fastening ring that is separate from the sheath material.

By means of this alternative to the state of the art, a machine foot in which the thickness of the sheath material is not, to the same degree, decisive in relation to its load bearing capacity, is provided. The reason is that the threads, in which the screws are fixed, are provided in a dedicated ring, so that it is possible to obtain the necessary material thickness for the inner thread which the screws must be mounted into, while, at the same time, keeping the thickness of the sheath down. It would be possible to produce the sheath and the ring in one solid piece of steel, but this would make the geometry of the sheath more complicated and reduce its producibility, so that it for example would not be able to be punched in relatively thin plate material with subsequent cold pressing or in other ways be provided with the desirable cup-shaped geometry. The thrust that is transmitted down through the load cell and down towards the bottom plate via the column, is then more or less carried by the screws and thus the fastening ring, and finally via the fastening of the fastening ring against the sheath, by the sheath itself, so that the load cell cannot be moved down into the foot, without the sheath following.

It is preferred that the ring has knobs with added material where the screws are mounted, so that there around each threaded bore is a material thickness which is not smaller than the radius of the threaded bore. Thereby, it is possible for the ring to have a cross sectional thickness across the perimeter, the area of which does not exceed the cross sectional area of the screws.

It should be noted that the connection between the lower part of the machine foot and the column thereto does not allow thrust from the column to be transmitted directly to the upper side of the sheath. The thrust is transmitted from the column via a load carrying screw with connected screw head directly to the upper side of the load cell. However, the column is in contact with the upper side of the sheath along an underlying rim of the column via a sealing ring. The screw head of the load carrying screw is located under the sheath and has a shaft that passes up through the opening in the top of the sheath. The load bearing screw can be provided with a long shaft for mounting by screwing from underneath in a threaded bore in the column, or it can be provided with a short shaft without threads, so the head of the screw at its downward facing contact surface transmits thrust to the upper side of the load cell, and by its upward facing contact surface at the end of a short shaft absorbs thrust via contact with the lower side of the column. In the latter case, the column can be lifted free of the foot without further ado, and in the first case, foot and column will constitute a continuous, but separable unit.

As stated in claim 3, It is preferred that a gap between the fastening ring and the sheath is moulded with a curable resin. In this way a safe and strong connection between the sheath and the fastening ring is achieved and it is easy to establish. The curable resin can for instance comprise a rubber material which can be vulcanized. The advantage of such curable materials is that they bind with considerable strength to the metals that are used for the fastening ring and the sheath—in this case stainless steel. Other types of polymers apart from rubber can be used for this purpose, but rubber compounds can be produced with a desired hardness and, furthermore, have a particularly good ageing resistance. By this method of connection it is ensured that there are not any visible marks or anything else that could mar the appearance thereof and also complicate the cleaning of the upper side. The provision of a connection between the sheath and the fastening ring based on welding or through screws, would thus give rise to marks and/or cracks. By means of the method for achieving the transmission of thrust from the fastening ring that is separate from the sheath, to the sheath, it is also ensured that the sheath when loaded is pulled downwards, so that no added thrust occurs between the upper side of the sheath and the lower side of the column, when the column is put under load.

As stated in claim 4, the screws extend perpendicular to a supporting plane of the lower part of the machine foot, and the screws have screw heads, the lower side of which contact the outer face of the bottom plate of the lower part. In this way a safe fastening of the bottom plate to the fastening ring is achieved, so that the bottom plate can resist a downward thrust corresponding to the total tensional strength of the screw shafts of the screws used.

Furthermore, as stated in claim 4, the screws extend perpendicular to the supporting plane of the lower part of the machine foot, and they have screw heads the lower side of which abut the outer face of the bottom plate of the lower part.

The column can be provided with an external thread at the top, so that it can be fastened to a machine, and this thread can be provided with a thread protecting sheath, which can be screwed along the thread to abutment with the lower part of the machine. In other embodiments of the column, it comprises a regular telescopic connection between a part belonging to the lower part and a part which is mounted in the machine.

Typically, a telescopic length adjustment takes place via threaded spindles which constitute parts of the column, but can also be established via a hydraulic cylinder and piston connection.

The column has 2 degrees of freedom, as it can rotate about its longitudinal axis in relation to the lower part of the machine foot, and as it can rotate perpendicular to its longitudinal axis around a centre point at the point of contact of the load bearing screws against the load cell, and this is achieved by shaping the area around the abutment of the sealing ring against the sheath as a part of a spherical shell with the same centre as the centre of the rotation of the column perpendicular to its longitudinal axis. It is possible that the load bearing screw can have an upwards facing contact surface against the lower side of the sheath, and this upward facing contact surface and the related lower side of the sheath must also here be shaped as parts of spherical shell surfaces with the same centre as the centre of the rotation of the column perpendicular to its longitudinal axis. The rotation perpendicular to the longitudinal axis will take place as a tilting movement, where the centre of this rotation is located outside the column and will typically be located right on or above the centre of the load cell.

The idea of the screw head is partly to transfer vertical forces and only vertical forces, partly to function as a ball joint which allows for up to 5 degrees of slope of the floor (that means between the lower part and the column) and at the same time control the transmission of force.

Figure 15:
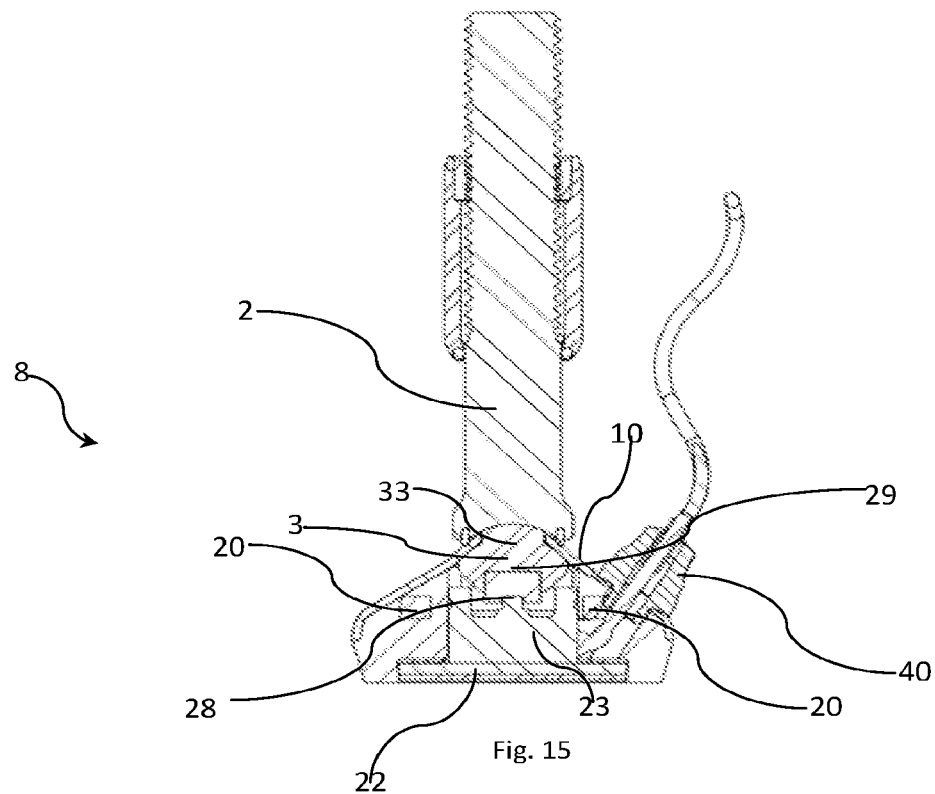
Figure 16:
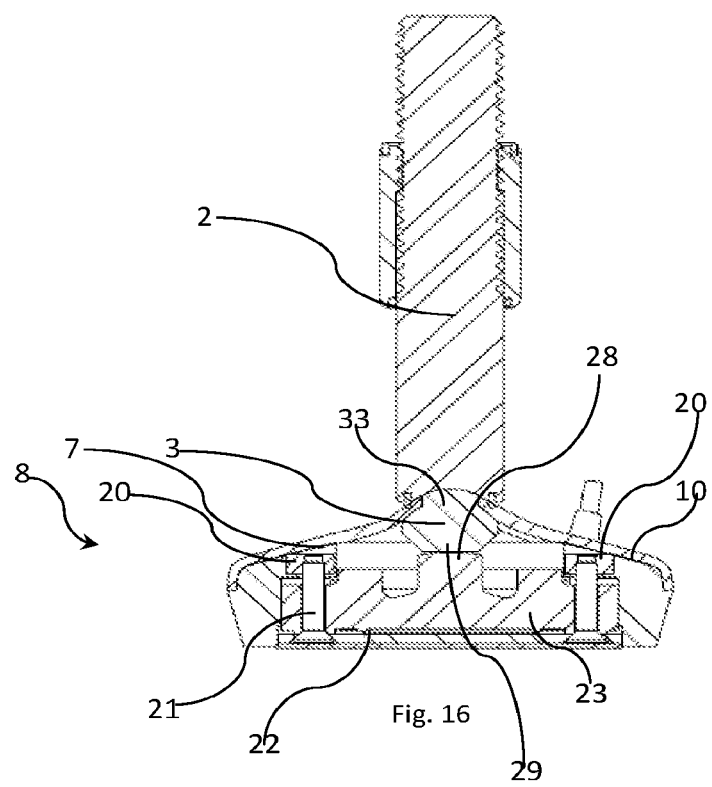

Other connections between the lower part of the machine foot and the column can occur, where for instance the load bearing screw, as it is shown in FIG. 15 and FIG. 16, can be designed without shaft and connection with the column, and in this case the column will just rest on the lower part of the machine foot, and thus not be connected in a fixed relationship thereto. However, the transmission of force is the same when thrust is occurring, as it is transmitted directly through the load bearing screw and down into the load cell without the sheath receiving any thrust from the column.

Furthermore, the invention relates to a method of production of a machine foot of the type mentioned above. According to the method, a rubber resin is moulded into the sheath of the machine foot and is vulcanized thereon in such a way that the fastening ring is embedded in the rubber resin in an area that abuts the lower side of the sheath.

The moulding takes place in a mould with a loose core that keeps the space open for the load cell centrally around the opening in the top of the sheath, said fastening ring being fixed to the core with fastening screws in each of the threaded bores of the fastening ring.

Initially, during moulding, the fastening ring must be fastened to the core with a fastening screw in each threaded bore, so that the threaded bores are not filled with resin. This is easiest done by passing the fastening screws through holes in the core and screw them into the threaded bores of the fastening ring prior to moulding. When the moulding is finished and the resin is cured, the mould can be opened and the fastening screws can be unscrewed form the threaded bores of the fastening ring, and thereafter the core can be lifted out of the mould leaving a space that enables mounting of the load cell in the machine foot. The fastening ring will be covered in resin, but with open threaded bores, where especially the area between the fastening ring and the sheath is filled with resin. Typically, the resin is a rubber which can be vulcanized and have a particularly good adhesion to the steel in the fastening ring as well as the sheath, whereby the rubber resin functions as glue between the fastening ring and the sheath.

Mounting takes place by first mounting the load cell followed by the bottom plate in the space which the core has left centrally in the resin, and finally the screws are mounted, which fastens the load cell to the fastening ring via the bottom plate and the screw bores therein.

Figure 2:
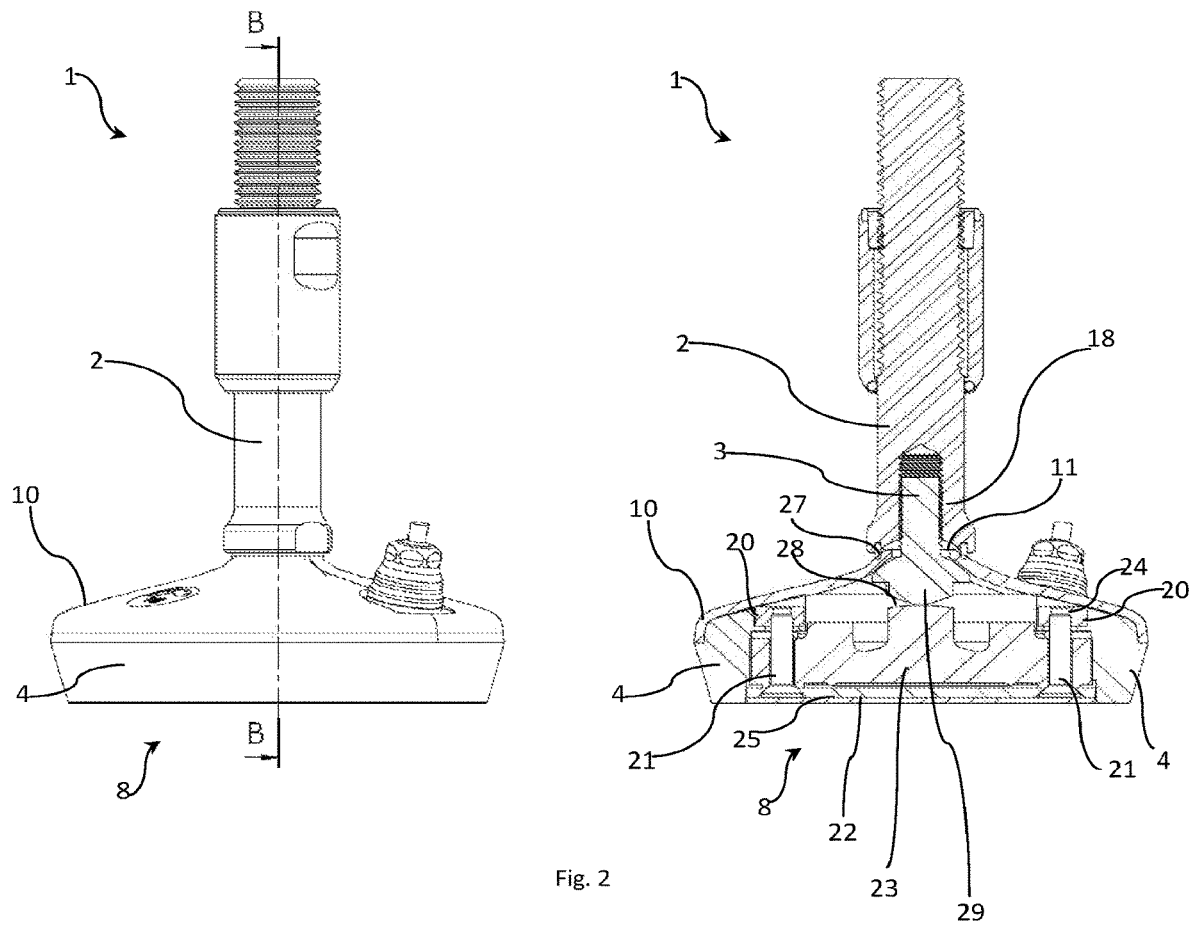
Figure 3:
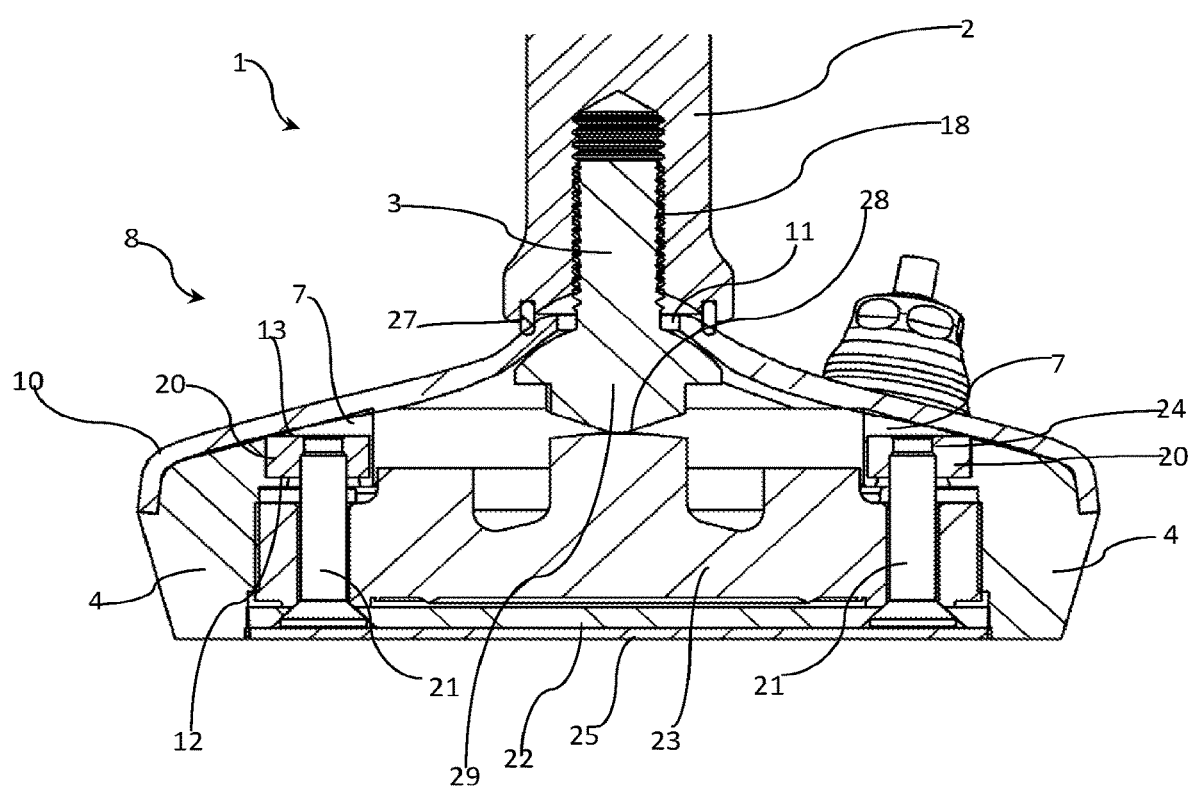
Figure 4:
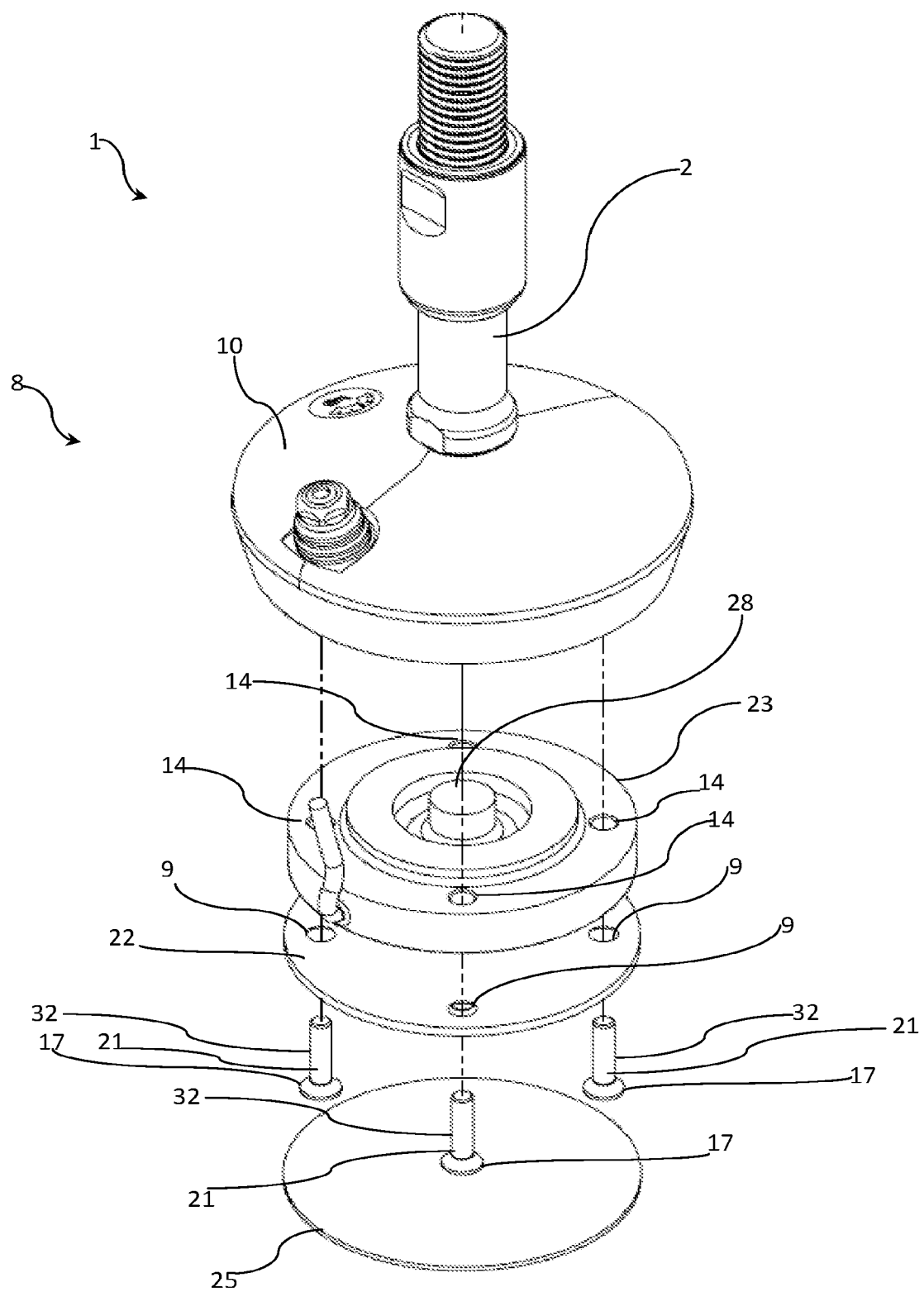
Figure 5:
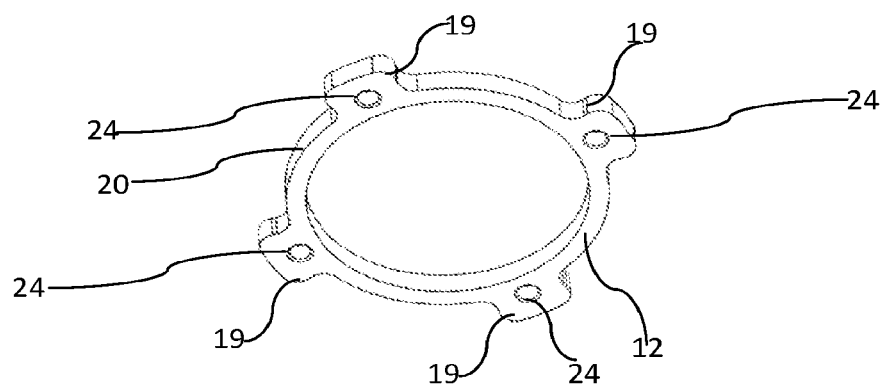
Figure 6:
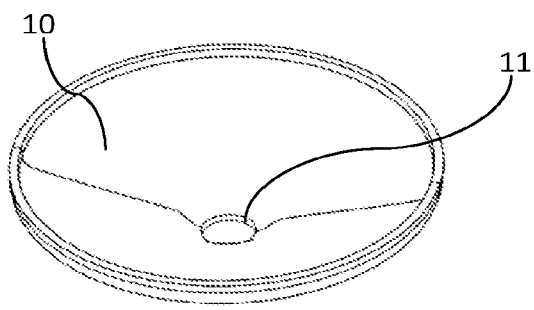
Figure 7:
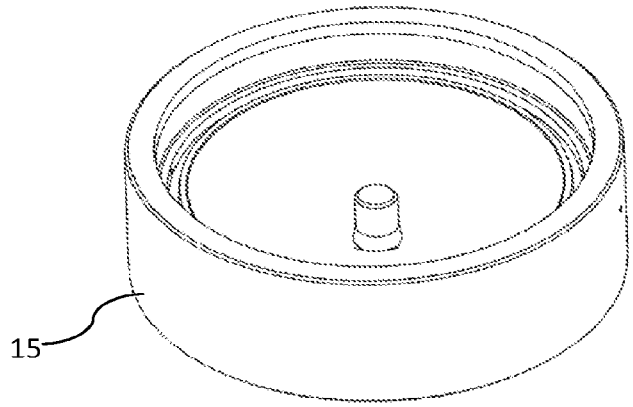
Figure 8:
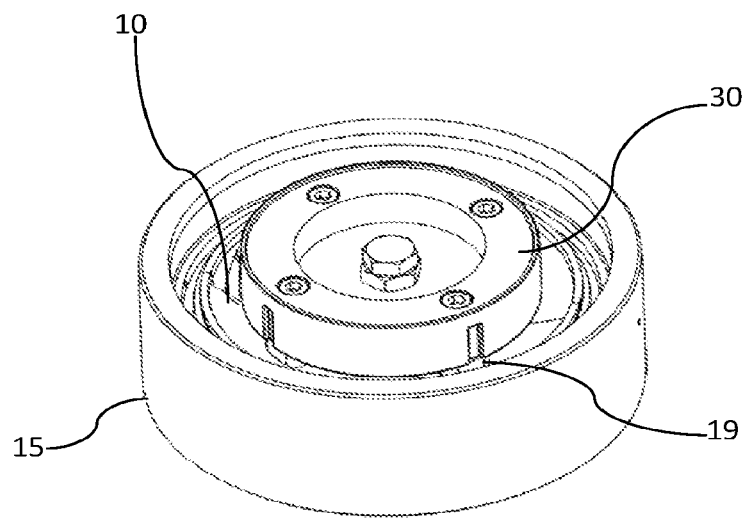
Figure 9:
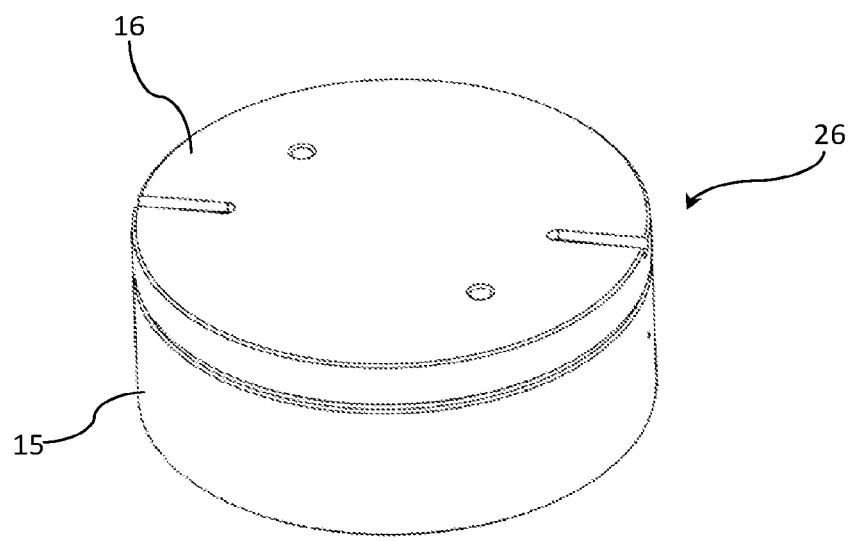
Figure 10:
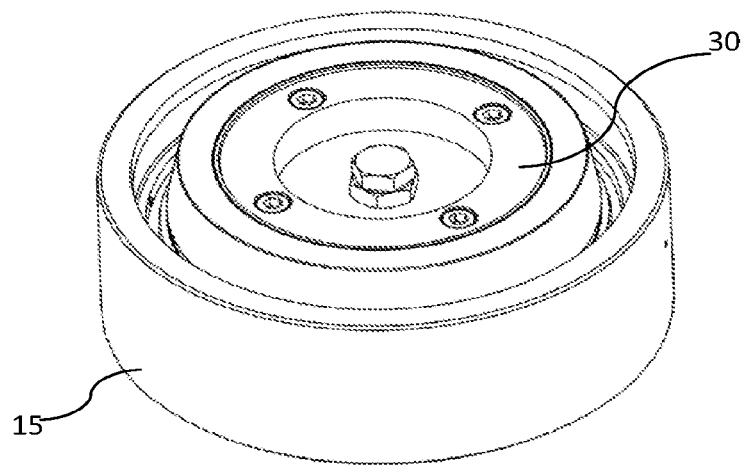
Figure 11:
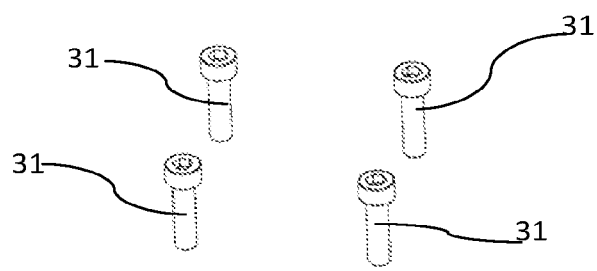
Figure 11:
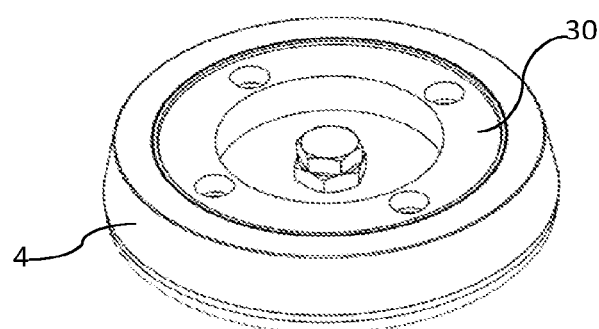
Figure 12:
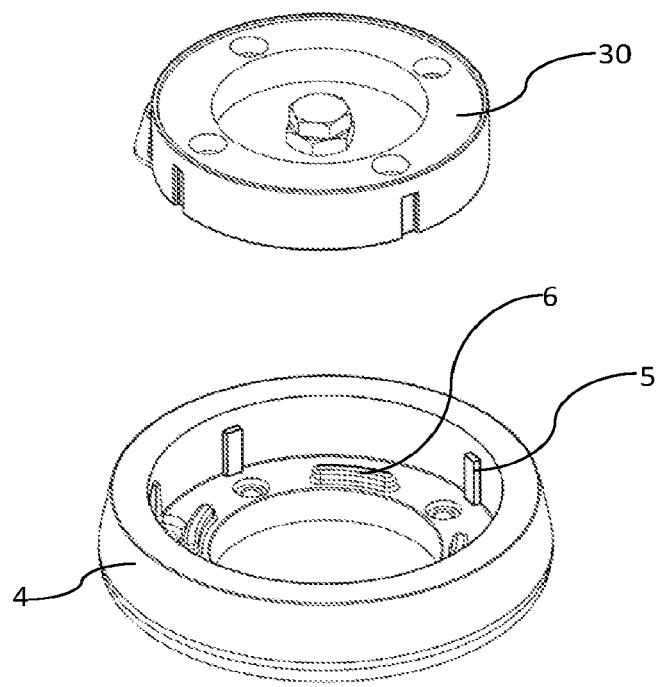
Figure 13:
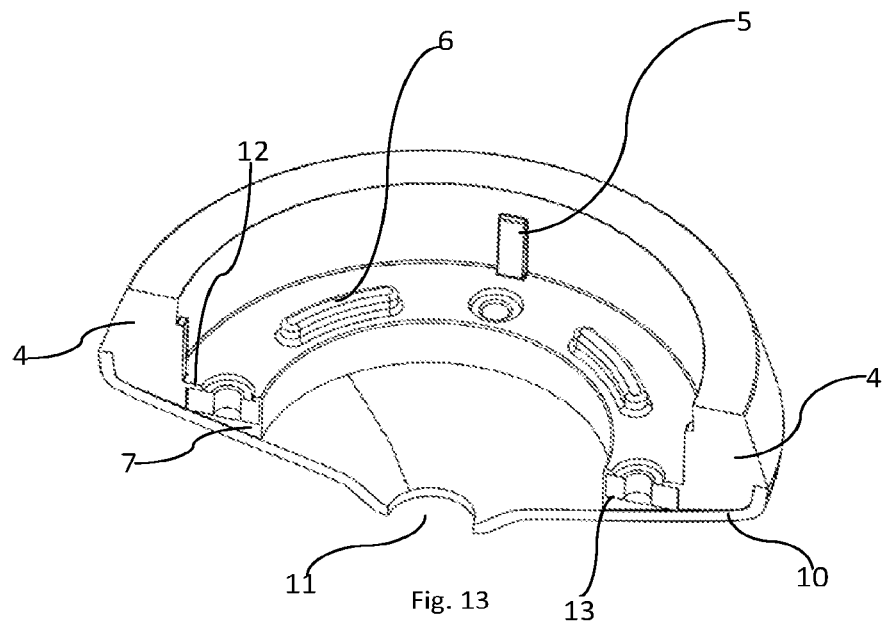
Figure 14:
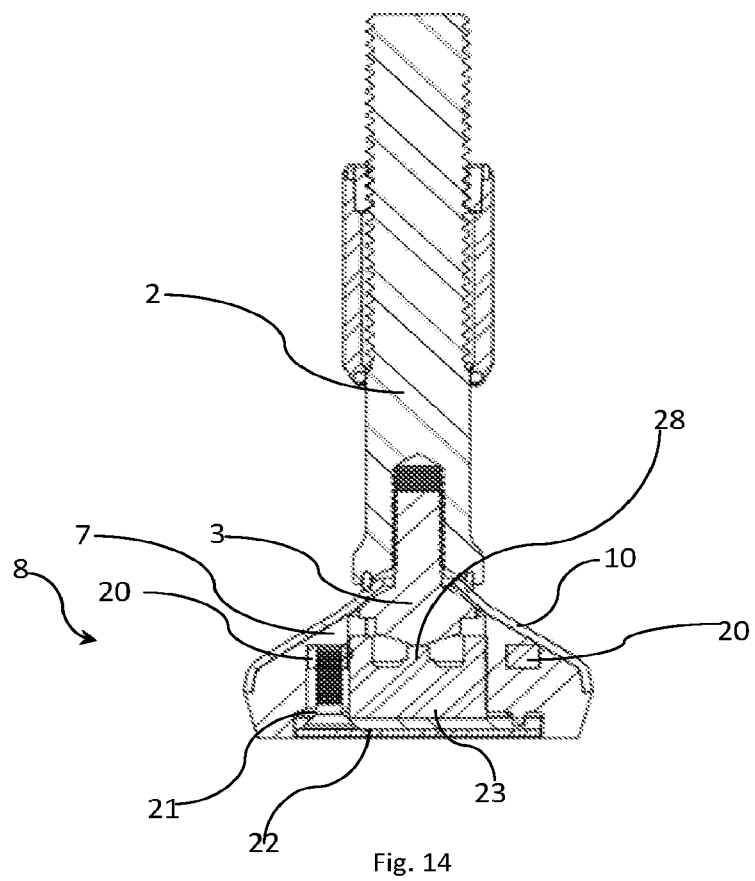
Figure 17:
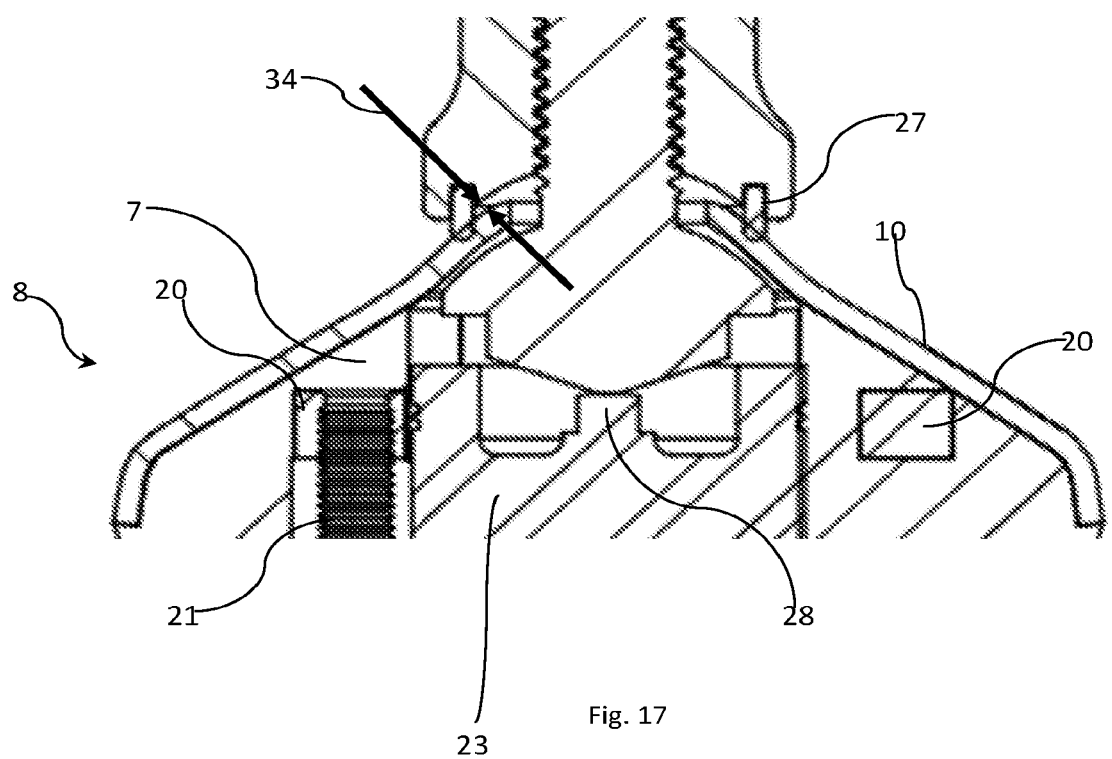

The invention will be explained in further detail in the following with reference to the drawings, in which:

FIG. 1 shows the machine foot 1 in a side view to the left, and to the right is a sectional view along the plane AA indicated to the left, FIG. 2 shows the machine foot 1 as shown in FIG. 1 but rotated approximately 45 degrees, FIG. 3 is an enlarged view of the machine foot 1 shown to the right in FIG. 2, FIG. 4 is an exploded view of the machine foot 1 shown in FIG. 1 and FIG. 2, FIG. 5 shows the fastening ring 20 in a 3D representation, FIG. 6 shows the sheath 10 in a 3D representation, seen from below, FIG. 7 shows the bottom part 15 of the mould with the sheath 10 located therein, FIG. 8 is a 3D representation of the bottom part of the mould with the core 30 and the ring 20, FIG. 9 shows the lower part 15 and upper part 16 of the mould 26, FIG. 10 shows the lower part 15 of the mould 26 with the completely moulded but not yet de-moulded item, FIG. 11 is an illustration of the first part of the de-moulding where the screws 31 are removed, FIG. 12 shows the last part of the de-moulding, where the core 30 is elevated from the item, FIG. 13 shows a 3D representation of a sectioned item after de-moulding, FIG. 14 shows a sectional view of a machine foot according to an alternative embodiment, where only 3 screws 31 are used, FIG. 15 is a sectional view of a further embodiment, where the column is mounted loosely on top of the load bearing screw, FIG. 16 is a sectional view of an embodiment similar to the one shown in FIG. 15, but with a larger foot print an thus larger capacity, and FIG. 17 is an enlarged sectional view of the embodiment shown in FIG. 14.

In FIG. 13 is shown, how the mounting ring of the fastening ring 20 as a result of the moulding method is embedded in rubber and thus fixed or glued to the sheath 10.

It should be noted that a machine foot of this design can be mounted according to EHEDG and 3A standards and, furthermore, it is USDA approved.

The appearance of the machine foot is in accordance with the other devices of the machine, which can be levelled.

As it is shown in FIG. 2, it is possible, by letting the screws pass through the bores in the bottom plate 22 and through the load cell 23 and up through threaded bores 24 in the fastening ring 20 that is vulcanized onto, that the load cell 23 is fixed without horizontal forces affecting the vertical measurement.

In the long run, these solutions open the opportunity for logging the state of machines or entire production lines. In this way, questions like: Do they vibrate? Are they exposed to shock? Are they affected beyond the maximal permissible load bearing capacity? etc., can be answered directly on-line during service. Hence, the signal from the load cell 23 can be used continuously and not only when several machine feet on one machine must be adjusted so that they share the load evenly. By continuous logging and analysing, the operating condition and possible disturbances can be ascertained. It is possible to send the signal to a central control unit of the machine and compare it with the operating parameters that are adjusted here, to locally be able to diagnose possible disturbances during service. Furthermore, it is possible to collect data concerning disturbances during service more globally on machines, for instance in relation to one's facilities which are in service in different places around the globe.

All loads can be measured, however, the shown machine foot with load cell is designed to receive load cells which can manage loads of up to 5 tons, but higher loads can accommodated if the load cell is adapted to handle it.

Cables to and from the lower part 8 of the machine foot are fastened by means of a hygienic PEG-fitting 40 that is shown in FIG. 2 and FIG. 15.

The special load distribution from the column 2, to the load cell 23, to the fastening ring 20, to the sheath 10, to the rubber 4, and finally to the floor ensures that the sheath 10 is never in direct load transferring contact with the column 2, and that the rubber 4 is pressed towards the surface of the floor, so that grime does not enter between the lower part 8 of the machine foot 1 and the floor. As shown in FIGS. 3, 14, 15 and 16, the force from the column 2 passes through the load bearing screw 3 to the upper side of the load cell 23, where thrust from the load bearing screw 3 is transmitted to a central load bearing area 28. Hence, the load cell 23 is squeezed between the bottom plate 22 and its upper side, where the bottom plate 22 rests onto the floor or another surface (not shown). As shown in FIG. 3, the lower part 8 is embedded in a curable resin, in this case a vulcanized rubber 4 which is most easily seen in FIG. 12 and which furthermore contacts the floor all around along the lower part 8 of the machine foot. As explained, this part is formed by vulcanized rubber 4, and the flexibility can be controlled to a certain degree, so that contact with the floor along the rim of the lower part 8 of the machine foot is ensured. If the rim is supported so that the central parts of the machine foot, which are constituted by the bottom plate 22, are not supported, the screws 21 are activated and ensures that the force between the rim and the column will still be transferred via the load cell 23, as the rim that is constituted by vulcanized rubber 4 transfers the force to the sheath 10 from which the force is transferred to the fastening ring 20 and from there to the screws 21 that thence carry the bottom plate 22, so that it is not pushed out of the foot. At the same time the pulling force between the fastening ring 20 and the sheath 10 ensure that the sheath 10 is moved downwards, when the load bearing screw 3 is loaded by the column thrust, so that there is not any contact force between the column and the sheath except for the initial thrust which the sealing that is mounted here is loaded with from the beginning. From the bottom plate the force will pass through the load cell 23 and to the column 2. In daily use there will be force equilibrium, so that the screws 21 carry a part of the load on the column and the rest is carried by the bottom plate 22, but the total weight from the column will always pass through the load cell 23.

The fastening ring 20 has a lower side 12 and an upper side 13 that are both, when the fastening ring 20 is mounted, flat and parallel with the supporting plane of the lower part 8, as it is shown in FIG. 3. Hereby, the force from the screws 21 to the fastening ring 20 is transferred without the possibility of it being pulled in a lateral direction by the downward tensile load from the load cell.

The load cell 23 is totally protected against shocks, grime, temperature oscillations and tensile forces on the cable, as it is located under the sheath 10 and is surrounded by vulcanized rubber 4, as can be seen in FIG. 3.

The load cell 23 is kept in place laterally by means of four side guides 5 in the rubber 4, and these guides can easily be seen in FIG. 12 and FIG. 13. When the load cell 23 is mounted with four mounting screws 21 down into the fastening ring 20 and here the load cell 23 is squeezed against four elevated areas 6 in the rubber, the screws are tightened, until the cell 23 pushes against the lower side of the hardened load bearing screw 3. When the load bearing screw 3 cannot be moved, all four screws are loosened approximately 0.5 turn and the load bearing screw is now loose but very close to the load cell 23. The four elevated areas 6 ensure that the load cell 23 is locked in the optimum position. The screws can be fixed with Loctite, so they cannot come loose from the fixed position due to vibrations.

In the following, referring to FIGS. 7-10, the method of producing the foot will be explained. The moulding takes place in a mould 26 (shown assembled in FIG. 9) with a loose core 30 which is shown in FIG. 8 and which ensures space for the load cell 23 centrally around the opening 11 of the sheath 10, as the fastening ring 20 is fixed to the core 30 with a fastening screw 31 in each of the threaded bores 24 of the fastening ring 20.

Initially when moulding the fastening ring 20 must be fixed to the core 30 with a fastening screw 31 in each of the threaded bores 24, so that the threaded bores 24 are not filled with molten material. To this end the fastening screws 31 are passed through bores in the core 30 and are screwed into the threaded bores 24 of the fastening ring prior to moulding. Then the moulding is finished and the molten material is hardened, the mould 26 can be opened by separating the upper part 16 and the lower part, and the fastening screws are unscrewed from the threaded bores 24 of the fastening ring, and afterwards the core 30 can be lifted out of the mould leaving a space that enables mounting of the load cell 23 in the machine foot. This is illustrated in FIG. 12.

When mounting, the load cell 23 followed by the bottom plate 22 are mounted in the area that the core 30 has left centrally in the moulding 4, and finally the screws that fasten the load cell 23 to the fastening ring via the bottom plate 22 and the threaded bores therein. A finishing cover foil 25 is mounted before use or is provided as an integrated part of the bottom plate 22.

The load cell has a rim area and openings 14 therein, and by letting screws 21 pass through these openings the load cell is further fastened, so that it can neither rotate or be moved in a lateral direction in the foot. This is as an example illustrated in FIG. 2.

As shown in FIG. 3, the load bearing screw 3 in the shown embodiment according to the invention has a threaded part 3 and a screw head 29, and the threaded part is mounted in an axially extending threaded bore 18 straight up into the lower part of the column, as mounting takes place through the central opening 11 in the sheath, so that the area around the opening 11 is clamped between the screw head and the lower rim around the threaded bore 18. A sealing 27 is provided between the sheath and the lower rim of the column. Furthermore, the exterior as well as the interior of the sheath around the opening 11 are shaped as spherical shell surfaces with uniform diameters and common centre. Furthermore, the head 29 of the screw that faces the sheath is shaped as a part of a spherical shell surface and has, when mounted against the lower side of the sheath, common centre with the spherical shell surfaces that are provided in the sheath. In this way, the sheath and the column function as to parts of a ball joint, an as the threaded part of the load bearing screw, furthermore, has a somewhat smaller diameter than the opening 11 in the sheath 10, the column is movable in several directions. Furthermore, the contact surface between the load bearing screw and the upper side of the load cell is shaped so that the load bearing screw can roll or slide against it in the embodiment in which the load bearing screw is mounted in the column. The geometry of the thrust loaded surface of the load cell and the contact surface of the load bearing screw must be adjusted, so that the contact between the two surfaces is obtained no matter the angular position of the column in relation to the foot.

As can be seen in FIGS. 3, 13 and 14, the area 7 between the upper side of the fastening ring and the lower side of the sheath 10 is an annular area with a triangular cross section. As stated previously, this area is embedded with a rubber resin that subsequently is vulcanized, and by choosing suitable combinations of metals and rubber, it is possible to obtain a very secure binding between the fastening ring and the sheath.

FIGS. 15 and 16 show an embodiment in which the load bearing screw 3 is not threaded into the column, but has only a short shaft 33 which just extends over the rim of the central opening 11, so that the upper side of this shaft 33 can function as a contact surface for the lower side of the column 2. The upper side of the short shaft 33 and the lower side of the column is in that case shaped as complementary spherical shell surface, and, furthermore, the part of the lower side of the column, which extends past the rim of the central opening 11 of the sheath 10, is provided with a groove for mounting of a sealing 27 which abuts the upper side of the sheath in the area around the opening 11. Furthermore, this contact area is shaped as a spherical shell surface, so that the column 2 can tilt around a common centre of said spherical shell surface. The short shaft 33 of the screw 3 has a diameter similar to the opening 11, as the shaft does not move in relation to the sheath 10, like it would do with a load bearing screw 3 which is fixed into the column 2. Furthermore, the screw head 29 of the load bearing screw is in this embodiment provided with a relatively flat contact surface against the surface of the load cell, as there is no movement between the two of them, when the column 2 is tilted.

In FIG. 17 it can be seen, how, between the sheath 10 and the lower side of the part of the column 2, which extends past the opening 11 of the sheath 11, there is a gap, indicated with the reference numeral 34, shown in the FIG. with a set of arrows. The gap 34 ensures that there at no point of time under normal load will occur direct contact between the lower side of the column and the upper side of the sheath. Such a contact would cause thrust to be transmitted between the lower side of the column and the floor without passing through the load cell and consequently lead to an erroneous registration of the load. This must be avoided, and a gap of not less than 1 mm takes a part in ensuring this. By means of the seal 27 will no grime enter the gap.

REFERENCE NUMERALS

1 Machine foot
2 Column
3 Load bearing screw
4 Rubber
5 Lateral guide
6 Elevations
7 Distance between the fastening ring and the sheath
8 Lower part of the machine foot
9 Screw bores
10 Sheath
11 Opening of the sheath
12 Lower side of the fastening ring
13 Upper side of the fastening ring
14 Openings in the rim area of the load cell
15 Lower part of the mould
16 Upper part of the mould
17 Screw heads
18 Threaded bore in the column
19 Knobs
20 Fastening ring
21 Screws
22 Bottom plate
23 Load cell
24 Threaded bores
25 Cover foil
26 Mould
27 Sealing
28 The central thrust bearing area of the load cell
29 Screw head of the load bearing screw
30 Core
31 Fastening screws
32 Shaft
33 Short shaft of the load bearing screw
34 Gap

The invention claimed is:

1. A machine foot with built-in load cell, said load cell being suspended in an overlying sheath, where screws which hold the load cell in place in a lower part of the machine foot, pass through a bottom plate, wherein the screws are screwed up into a fastening ring that is separated from the sheath material, wherein a gap between the fastening ring and the sheath is molded with a curable moulding resin, so that the tension in the screws is transferred to the lower side of the sheath.

2. The machine foot according to claim 1, wherein the fastening ring comprises threaded bores and knobs with added material where the screws are fastened to the fastening ring, so that there is a thickness of the material around each threaded bore, which as a minimum is not smaller than the radius of the threaded bore.

3. The machine foot according to claim 1, wherein the screws extend perpendicular to a supporting plane of the lower part of the machine foot and have screw heads, the lower side of which contact an outer face of the bottom plate of the lower part.

4. The machine foot according to claim 1, wherein each of the screws have a shaft which extend through openings in a rim area of the load cell.

5. The machine foot according to claim 1, wherein the fastening ring comprises a lower side and an upper side and they are both, when the fastening ring is mounted, flat and parallel with a supporting plane of the lower part.

6. A method for production of a machine foot of the type mentioned in claim 1, whereby a curable molding resin is molded in the sheath of the machine foot, said molding resin binds to the sheath during the curing process, so that the fastening ring is embedded in the molding resin in an area that abuts a lower side of the sheath.

7. The method according to claim 6, wherein the molding takes place in a mold with a loose core which leaves space for the load cell around a centrally located opening in the sheath, whereby the fastening ring during molding is fixed to the core by means of a fastening screw in each of the threaded bores in the fastening ring.

8. The method according to claim 7, wherein the core after molding and curing is removed, the fastening screws are unscrewed from the fastening ring, the load cell is mounted in the opening that the core leaves behind, and the bottom plate is fastened with screws to the fastening ring, said screws passing through screw bores in the bottom plate and furthermore passing through openings in a rim area of the load cell.

9. The method according to claim 7, wherein a column is mounted to thrust transferring contact against a centrally located thrust bearing area on the load cell, said column, or a load bearing screw that is coupled to the column, passes through the centrally located opening in a top of the sheath.

10. The method according to claim 8, wherein a column is mounted to thrust transferring contact against a centrally located thrust bearing area on the load cell, said column, or a load bearing screw that is coupled to the column, passes through the centrally located opening in a top of the sheath.

* * * * *